US012134271B2

(12) United States Patent
Lee et al.

(10) Patent No.: US 12,134,271 B2
(45) Date of Patent: Nov. 5, 2024

(54) PRESSURE CONTROL DEVICE AND SUBSTRATE TREATMENT APPARATUS INCLUDING THE SAME

(71) Applicant: SEMES CO., LTD., Cheonan-si (KR)

(72) Inventors: Dong Hwa Lee, Anyang-si (KR); Dai Geon Yoon, Anyang-si (KR); Bong Man Choi, Cheonan-si (KR); Jong Suk Won, Seongnam-si (KR); Hyeong Jun Cho, Seoul (KR)

(73) Assignee: Semes Co., Ltd.

( * ) Notice: Subject to any disclaimer, the term of this patent is extended or adjusted under 35 U.S.C. 154(b) by 51 days.

(21) Appl. No.: 18/182,577

(22) Filed: Mar. 13, 2023

(65) Prior Publication Data

US 2024/0208211 A1 Jun. 27, 2024

(30) Foreign Application Priority Data

Dec. 26, 2022 (KR) ........................ 10-2022-0183963

(51) Int. Cl.
*B41J 2/045* (2006.01)
*B41J 2/14* (2006.01)

(52) U.S. Cl.
CPC ....... *B41J 2/04583* (2013.01); *B41J 2/14451* (2013.01)

(58) Field of Classification Search
CPC ................ B41J 2/04583; B41J 2/14451; B41J 2/04501; B41J 29/38; B41J 29/387; B41J 29/393
See application file for complete search history.

(56) References Cited

FOREIGN PATENT DOCUMENTS

| | | | | |
|---|---|---|---|---|
| JP | 6286387 | * 2/2018 | | B41J 2/175 |
| JP | 2018199326 | * 12/2018 | | B41J 2/175 |
| JP | 2022547363 | * 11/2022 | | B41J 2/175 |
| KR | 10-1397307 | 5/2014 | | |
| KR | 10-2018-0035532 A | 4/2018 | | |
| KR | 10-2261260 | 6/2021 | | |

* cited by examiner

*Primary Examiner* — Kristal Feggins
(74) *Attorney, Agent, or Firm* — Harness, Dickey & Pierce, P.L.C.

(57) ABSTRACT

Provided is a pressure control device for stably controlling the internal air pressure of a reservoir. The pressure control device includes: an input terminal receiving source air pressure; an intake valve connected between the input terminal and an output terminal; an exhaust valve connected to the output terminal; a pressure sensor connected to the output terminal and generating a sensed value by sensing pressure at the output terminal; and a controller simultaneously operating the intake valve and the exhaust valve by simultaneously operating a first control loop for adjusting the degree of opening of the intake valve by comparing the sensed value with a first target value and a second control loop for adjusting the degree of opening of the exhaust valve by comparing the sensed value with a second target value.

20 Claims, 12 Drawing Sheets

PRESSURE CONTROL DEVICE AND SUBSTRATE TREATMENT APPARATUS INCLUDING THE SAME

This application claims the benefit of Korean Patent Application No. 10-2022-0183963, filed on Dec. 26, 2022, in the Korean Intellectual Property Office, the disclosure of which is incorporated herein in its entirety by reference.

BACKGROUND

1. Field

The present disclosure relates to a pressure control device and a substrate treatment apparatus including the same.

2. Description of the Related Art

An inkjet nozzle provided in an inkjet head sprays fine droplets of several to several tens of nanograms to a substrate to form a thin film with a thickness of several microns. Therefore, it is necessary to precisely control the amount of ink ejected to manufacture a thin film of the quality required in a display or semiconductor process.

Here, negative pressure may be applied to the inkjet nozzle in order to precisely control the ink ejection amount. Accordingly, an end of the ink may be recessed into the nozzle, which is called a meniscus.

The state of the meniscus varies according to the internal pneumatic state of a reservoir (or ink tank) connected to the inkjet head. Therefore, the internal air pressure of the reservoir must be precisely controlled to keep the state of the meniscus stable and to precisely control the ejection amount.

SUMMARY

Aspects of the present disclosure provide a pressure control device for stably controlling the internal air pressure of a reservoir.

Aspects of the present disclosure also provide a substrate treatment apparatus including the pressure control device.

However, aspects of the present disclosure are not restricted to the one set forth herein. The above and other aspects of the present disclosure will become more apparent to one of ordinary skill in the art to which the present disclosure pertains by referencing the detailed description of the present disclosure given below.

According to an aspect of the present disclosure, there is provided a pressure control device including: an input terminal receiving source air pressure; an intake valve connected between the input terminal and an output terminal; an exhaust valve connected to the output terminal; a pressure sensor connected to the output terminal and generating a sensed value by sensing pressure at the output terminal; and a controller simultaneously operating the intake valve and the exhaust valve by simultaneously operating a first control loop for adjusting the degree of opening of the intake valve by comparing the sensed value with a first target value and a second control loop for adjusting the degree of opening of the exhaust valve by comparing the sensed value with a second target value.

According to another aspect of the present disclosure, there is provided pressure control device comprising: a negative pressure generating module receiving source negative pressure and generating process negative pressure through the operation of a first intake valve and a first exhaust valve; a positive pressure generating module receiving source positive pressure and generating process positive pressure through the operation of a second intake valve and a second exhaust valve; and a switching module selectively providing the process negative pressure or the process positive pressure to a target, wherein the negative pressure generating module comprises: a first input terminal receiving the source negative pressure; the first intake valve connected between the first input terminal and a first output terminal; the first exhaust valve connected to the first output terminal; a first pressure sensor connected to the first output terminal and generating a first sensed value by sensing pressure at the first output terminal; and a controller simultaneously operating the first intake valve and the first exhaust valve by simultaneously operating a first control loop for adjusting the degree of opening of the first intake valve by comparing the first sensed value with a first target value and a second control loop for adjusting the degree of opening of the first exhaust valve by comparing the first sensed value with a second target value.

According to an aspect of the present disclosure, there is provided a substrate treatment apparatus comprising: an inkjet head; a reservoir storing ink, providing the ink to the inkjet head, and selectively receiving process negative pressure or process positive pressure; and a pressure control device selectively providing the process negative pressure or the process positive pressure to the reservoir, wherein the pressure control device comprises: a negative pressure generating module receiving source negative pressure and generating the process negative pressure for controlling the meniscus of the inkjet head through the operation of a first intake valve and a first exhaust valve; a positive pressure generating module receiving source positive pressure and generating the process positive pressure for maintenance of the inkjet head through the operation of a second intake valve and a second exhaust valve; and a switching module selectively providing the process negative pressure or the process positive pressure to a target, wherein the negative pressure generating module comprises a first input terminal receiving the source negative pressure, the first intake valve connected between the first input terminal and a first output terminal, the first exhaust valve connected to the first output terminal, a first pressure sensor connected to the first output terminal and generating a first sensed value by sensing pressure at the first output terminal, and a first controller simultaneously operating the first intake valve and the first exhaust valve by simultaneously operating a first control loop for adjusting the degree of opening of the first intake valve by comparing the first sensed value with a first target value and a second control loop for adjusting the degree of opening of the first exhaust valve by comparing the first sensed value with the first target value, and the positive pressure generating module comprises a second input terminal receiving the source positive pressure, the second intake valve connected between the second input terminal and a second output terminal, the second exhaust valve connected to the second output terminal, a second pressure sensor connected to the second output terminal and generating a second sensed value by sensing pressure at the second output terminal, and a second controller simultaneously operating the second intake valve and the second exhaust valve by simultaneously operating a third control loop for adjusting the degree of opening of the second intake valve by comparing the second sensed value with a second target value and a fourth control loop for adjusting the degree of opening of the second exhaust valve by comparing the second sensed value with the second target value.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
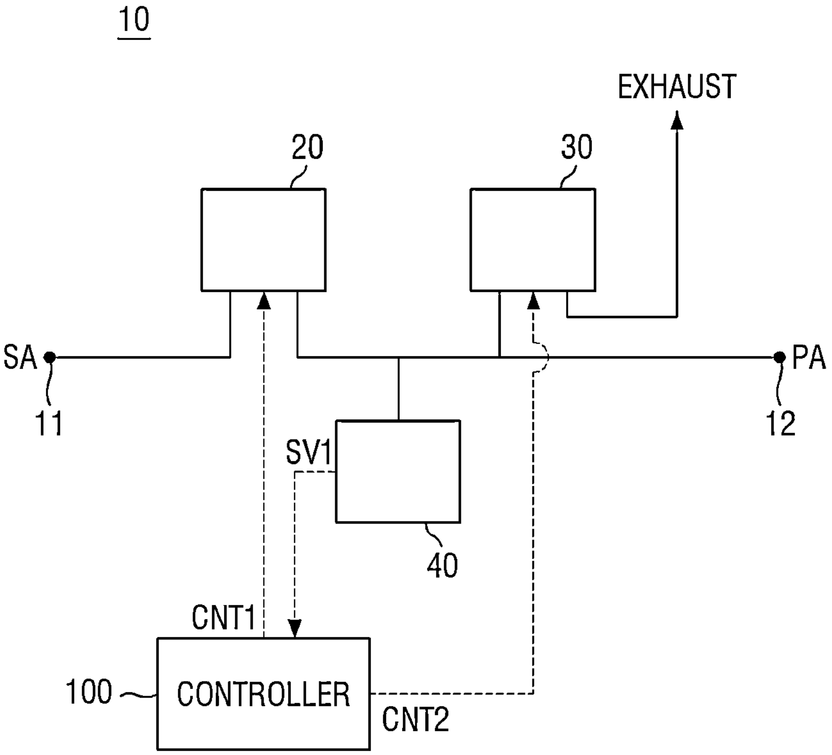
FIG. 1 is a block diagram of a pressure control device according to embodiments of the present disclosure.

Hereinafter, exemplary embodiments of the present disclosure will be described in greater detail with reference to the attached drawings. Advantages and features of the present disclosure and methods of accomplishing the same may be understood more readily by reference to the following detailed description of exemplary embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the invention to those skilled in the art, and the present disclosure will only be defined by the appended claims. Like reference numerals refer to like elements throughout the specification.

Spatially relative terms, such as "below," "beneath," "lower," "above," "upper" and the like, may be used herein for ease of description to describe the relationship of one element or component to another element(s) or component(s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" other elements or features would then be oriented "above" the other elements or features. Thus, the exemplary term "below" or "beneath" can encompass both an orientation of above and below. The device may be otherwise oriented and the spatially relative descriptors used herein interpreted accordingly.

It will be understood that, although the terms first, second, third, etc., may be used herein to describe various elements, components and/or sections, these elements, components and/or sections should not be limited by these terms. These terms are only used to distinguish one element, component or section from another element, component or section. Thus, a first element, component or section discussed below could be termed a second element, component or section without departing from the teachings of the present disclosure.

Hereinafter, embodiments of the present disclosure will be described in detail with reference to the attached drawings. In the following description with reference to the attached drawings, like or corresponding elements will be indicated by like reference numerals, and a redundant description thereof will be omitted.

Figure 2:
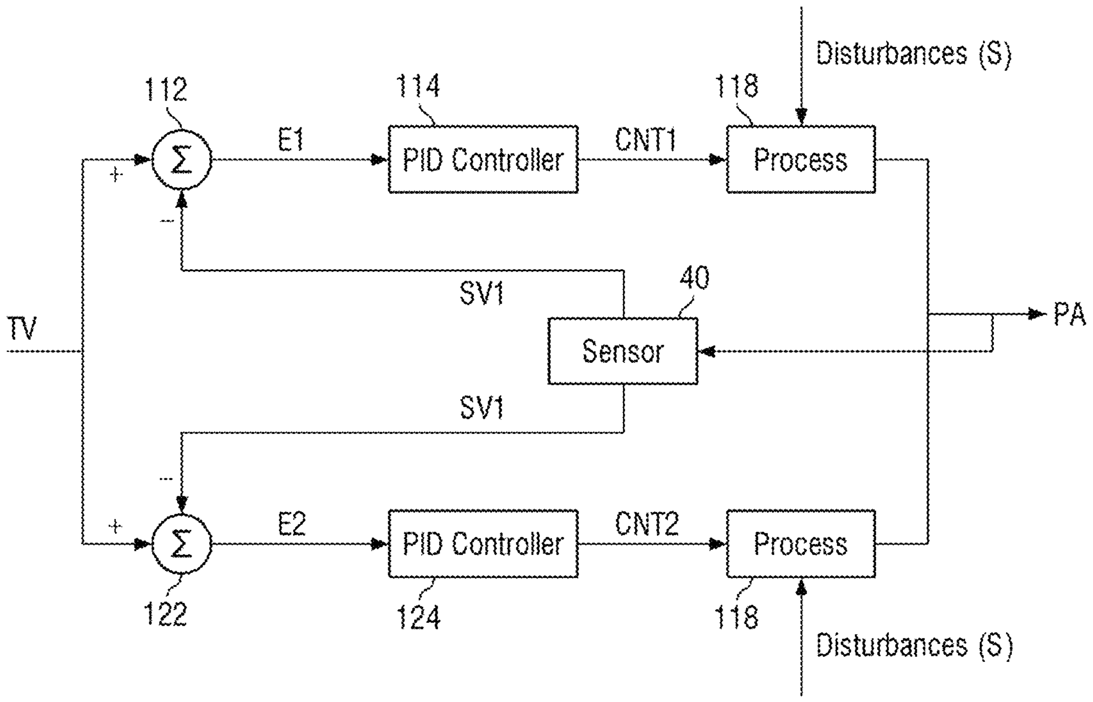
FIG. 2 is a diagram for explaining a control operation of a controller illustrated in FIG. 1.
Figure 3:
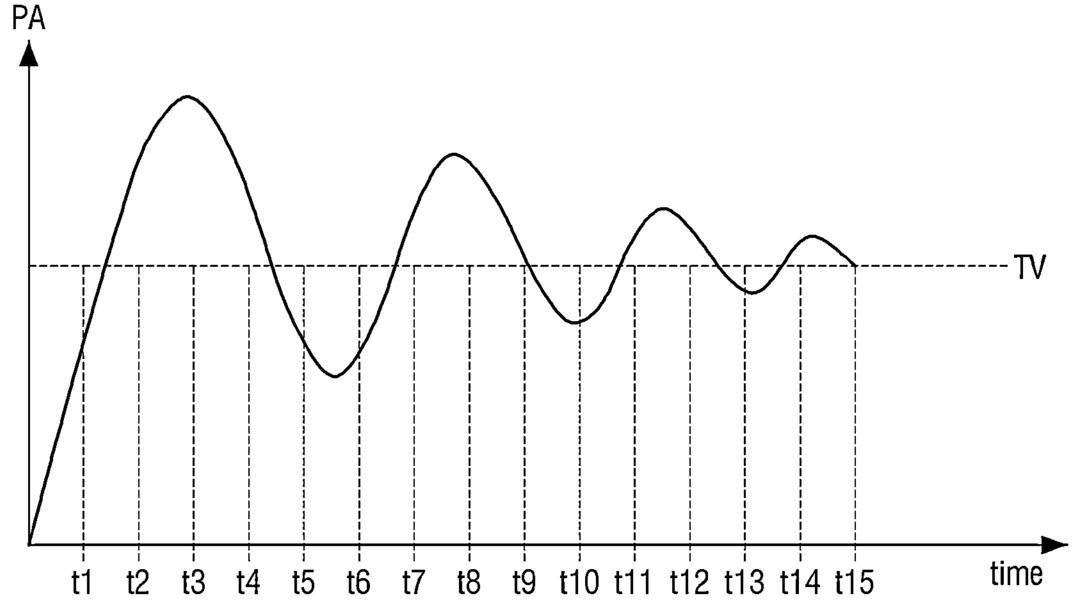
FIG. 3 is a diagram for explaining a change in process pressure illustrated in FIG. 1.
Figure 4:
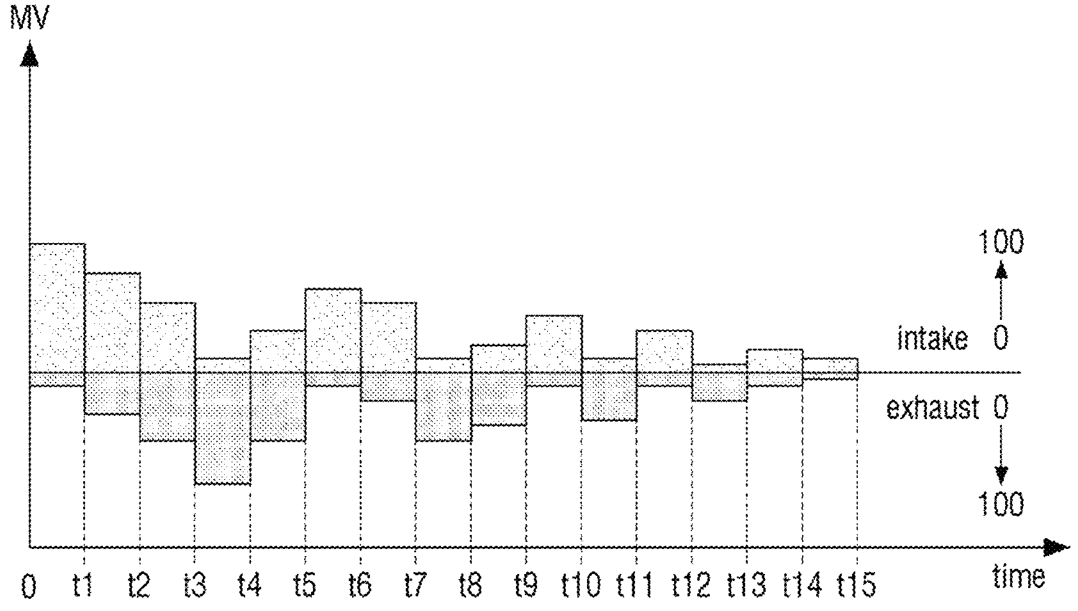
FIG. 4 is a diagram for explaining control of the degree of opening of an intake valve and control of the degree of opening of an exhaust valve illustrated in FIG. 1.

FIG. 1 is a block diagram of a pressure control device 10 according to embodiments of the present disclosure. FIG. 2 is a diagram for explaining a control operation of a controller 100 illustrated in FIG. 1. FIG. 3 is a diagram for explaining a change in process pressure PA illustrated in FIG. 1. FIG. 4 is a diagram for explaining control of the degree of opening of an intake valve 2 and control of the degree of opening of an exhaust valve 30 illustrated in FIG. 1.

First, referring to FIG. 1, the pressure control device 10 according to the embodiments of the present disclosure includes an input terminal 11, an output terminal 12, the intake valve 20, the exhaust valve 30, a pressure sensor 40, and the controller 100.

Source air pressure SA is provided through the input terminal 11. The source air pressure SA may be negative pressure or positive pressure. The negative pressure and the positive pressure are relative pressures when atmospheric pressure is used as a reference value (i.e., zero). A case where the source air pressure SA is negative pressure will be described below as an example.

The process air pressure PA is generated through the operation of the intake valve 20 and the exhaust valve 30. The process air pressure PA is output through the output terminal 12.

The intake valve 20 is connected between the input terminal 11 and the output terminal 12. The intake valve 20 may be a proportional control valve rather than an on/off valve. That is, the degree of opening of the intake valve 20 may be proportionally increased by a first control signal CNT1 (i.e., an electrical signal).

The exhaust valve 30 is connected between the output terminal 12 and an external exhaust line. The exhaust valve 30 may be a proportional control valve rather than an on/off valve. That is, the degree of opening of the exhaust valve 30 may be proportionally increased by a second control signal CNT2 (i.e., an electrical signal).

The pressure sensor 40 is connected to the output terminal 12 and generates a sensed value SV1 by sensing the pressure at the output terminal 12.

The controller 100 receives the sensed value SV1 and generates the first control signal CNT1 for controlling the intake valve 20 and the second control signal CNT2 for controlling the exhaust valve 30.

In some embodiments, the controller 100 operates a first control loop for adjusting the degree of opening of the intake valve 20 and a second control loop for adjusting the degree of opening of the exhaust valve 30. The sensed value SV1 of the pressure sensor 40 is commonly input to the first control loop and the second control loop, instead of separate sensed values being input to the first control loop and the second control loop, respectively.

Here, referring to FIG. 2, the controller 100 may operate according to, for example, a proportional-integral-differential (PID) control method. The PID control method is basically a feedback control method. In the PID control method, an output of an object to be controlled is measured and compared with a set point to calculate an error, and a control value required for control is calculated using the calculated error.

First, the pressure sensor 40 generates the sensed value SV1 by sensing the process pressure PA. The process pressure PA is the result of running a specific system/process 118. The specific system/process 118 may be related to, for example, a reservoir connected to an inkjet head and the intake valve 20/the exhaust valve 30 for regulating the pressure (internal air pressure) of the reservoir (see FIGS. 10 through 12).

The controller 100 includes a first calculator 112 and a first PID controller 114 for controlling the intake valve 20 and a second calculator 122 and a second PID controller 124 for controlling the exhaust valve 30.

The first calculator 112 calculates an error E1 by comparing the sensed value SV1 and a target value TV. The error E1 is a value that can change over time. The first PID controller 114 may calculate the first control signal CNT1 as the sum of a proportional term, an integral term, and a derivative term of the error E1. The proportional term is generated in proportion to the size of the error E1 in a current state, the integral term removes the error E1 in a steady state, and the derivative term reduces overshoot and improves stability by putting the brakes on a rapid change in output value.

Unlike in the above description, the first PID controller 114 may also be simplified and used in the form of a controller having only a proportional term or only proportional-integral terms or proportional-derivative terms. All of these modifications are also included in the first PID controller 114 referred to in the present disclosure.

The first control signal CNT1 may be a signal for controlling the degree of opening of the intake valve 20 in a system/process 118.

Similarly, the second calculator 122 calculates an error E2 by comparing the sensed value SV1 and the target value TV. The error E2 is a value that can change over time. The second PID controller 124 may calculate the second control signal CNT2 as the sum of a proportional term, an integral term, and a derivative term of the error E2. Unlike in the above description, the second PID controller 124 may also be simplified and used in the form of a controller having only a proportional term or only proportional-integral terms or proportional-derivative terms.

The second control signal CNT2 may be a signal for controlling the degree of opening of the exhaust valve 30 in a system/process 118.

The system/process 118 operate by receiving the first control signal CNT1 and the second control signal CNT2 and output the process pressure PA by being affected by disturbances S.

In summary, control of the intake valve 20 and control of the exhaust valve 30 are simultaneously performed based on the same sensed value SV1 through the above-described method. In addition, control of the intake valve 20 and control of the exhaust valve 30 are individually performed. Accordingly, the degree of opening of the intake valve 20 and the degree of opening of the exhaust valve 30 may be different from each other, but the intake valve 20 and the exhaust valve 30 may be simultaneously opened. That is, the intake valve 20 and the exhaust valve 30 are not exclusively controlled. Here, "exclusively controlled" means that one of the intake valve 20 and the exhaust valve 30 is controlled not to be opened while the other is opened.

The above method will be described in detail with reference to FIGS. 3 and 4.

Referring to FIG. 3, the x-axis represents time, and the y-axis represents process pressure PA. The process pressure PA reaches the target value TV over time t1 to t5.

Referring to FIG. 4, the x-axis represents time, and the y-axis represents manipulated variable MV. The manipulated variable above a center line indicates the degree of opening of the intake valve 20, and the manipulated variable below the center line indicates the degree of opening of the exhaust valve 30. The degree of opening of the intake valve 20 increases from the center line toward an upper side (e.g., 0→100). The degree of opening of the exhaust valve 30 increases from the center line toward a lower side (e.g., 0→100). Here, 0 indicates a state in which the intake valve 20 or the exhaust valve 30 is completely closed, and 100 indicates a state in which the intake valve 20 or the exhaust valve 30 is completely open.

Referring to FIGS. 3 and 4, the degree of opening of the intake valve 20 and the degree of opening of the exhaust valve 30 are individually controlled by the controller 100 (see FIG. 1). Therefore, the intake valve 20 and the exhaust valve 30 may be simultaneously opened, albeit different in the degree of opening.

When the degree of opening of the intake valve 20 is greater than the degree of opening of the exhaust valve 30, an intake operation is predominant because an intake amount is greater than an exhaust amount. Conversely, when the degree of opening of the exhaust valve 30 is greater than the degree of opening of the intake valve 20, an exhaust operation is predominant because the exhaust amount is greater than the intake amount.

For example, during the time from 0 to t2, the degree of opening of the intake valve 20 is greater than the degree of opening of the exhaust valve 30. Accordingly, the intake operation is predominantly performed, causing the process air pressure PA to increase.

During the time from t2 to t3, the degree of opening of the intake valve 20 and the degree of opening of the exhaust valve 30 are almost the same. Accordingly, the process air pressure PA stops increasing.

During the time from t3 to t5, the degree of opening of the exhaust valve 30 is greater than the degree of opening of the intake valve 20. Accordingly, the exhaust operation is predominantly performed, causing the process air pressure PA to decrease.

During the time from t5 to t6, the degree of opening of the intake valve 20 is greater than the degree of opening of the exhaust valve 30. Accordingly, the intake operation is predominantly performed, causing the decreasing process air pressure PA to increase again.

As the intake valve 20 and the exhaust valve 30 are controlled in this way, the process air pressure PA reaches the target value TV at a time t15.

A control operation of the pressure control device 10 according to the embodiments of the present disclosure will now be described in detail using FIGS. 1, 5, and 6.

Figure 5:
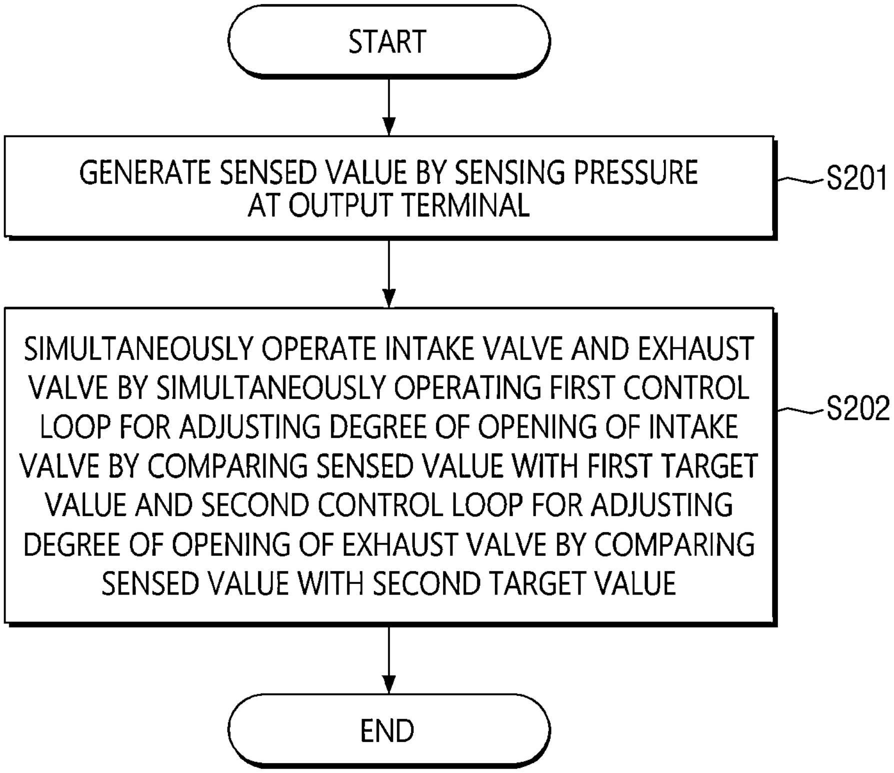
FIG. 5 is a flowchart illustrating a control operation of the pressure control device according to the embodiments of the present disclosure.

FIG. 5 is a flowchart illustrating the control operation of the pressure control device 10 according to the embodiments of the present disclosure. FIG. 6 is an exemplary flowchart illustrating operation S202 of FIG. 5 in detail.

First, referring to FIGS. 1 and 5, the pressure sensor 40 generates the sensed value SV1 by sensing the pressure at the output terminal 12 (operation S201).

Then, the controller 100 simultaneously operates the intake valve 20 and the exhaust valve 30 by simultaneously operating the first control loop for adjusting the degree of opening of the intake valve 20 by comparing the sensed value SV1 with a first target value TV1 and the second control loop for adjusting the degree of opening of the exhaust valve 30 by comparing the sensed value SV1 with a second target value TV2 (operation S202).

Figure 6:
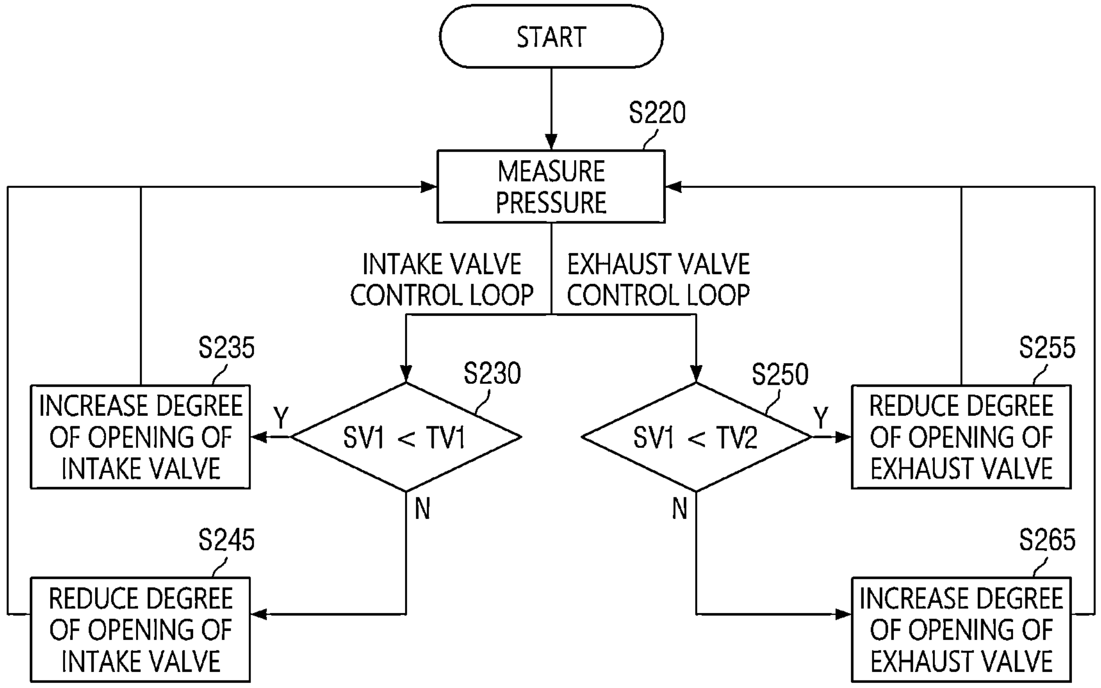
FIG. 6 is an exemplary flowchart illustrating operation S202 of FIG. 5 in detail.

Specifically, as illustrated in FIG. 6, the controller 100 individually operates an intake valve control loop (i.e., the first control loop) and an exhaust valve control loop (i.e., the second control loop) at the same time.

In the intake valve control loop, the sensed value SV1 and the first target value TV1 are compared, and the degree of opening of the intake valve 20 is adjusted based on the comparison result. Specifically, when the sensed value SV1 is smaller than the first target value TV1 (Y in operation S230), the degree of opening of the intake valve 20 is increased (operation S235). When the sensed value SV1 is greater than the first target value TV1 (N in operation S230), the degree of opening of the intake valve 20 is reduced (operation S245).

In the exhaust valve control loop, the sensed value SV1 and the second target value TV2 are compared, and the degree of opening of the exhaust valve 30 is adjusted based on the comparison result. Specifically, when the sensed value SV1 is smaller than the second target value TV2 (Y in operation S250), the degree of opening of the exhaust valve 30 is reduced (operation S255). When the sensed value SV1 is greater than the second target value TV2 (N in operation S250), the degree of opening of the exhaust valve 30 is increased (operation S265).

Here, the first target value TV1 and the second target value TV2 may be the same value. In this case, a control operation is performed with a concept to make the adjustment of the intake valve 20 and the adjustment of the exhaust valve 30 compensate for each other.

The first target value TV1 and the second target value TV2 may also be different values. In this case, a control operation is performed with a concept to stabilize the process air pressure PA through the adjustment of the intake valve 20 and to perform detailed downstream control through the adjustment of the exhaust valve 30.

In addition, the number of first control operations of the intake valve control loop and the number of second control operations of the exhaust valve control loop may be the same. That is, while the intake valve control loop runs once, the exhaust valve control loop also runs once. For example, as illustrated in FIG. 4, during the time from t1 to t2, the degree of opening of the intake valve 20 is adjusted once, and the degree of opening of the exhaust valve 30 is adjusted once.

The pressure control device 10 according to the embodiments of the present disclosure has the following features.

The adjustment of the degree of opening of the intake valve 20 and the adjustment of the degree of opening of the exhaust valve 30 are configured as independent (or individual) control loops. Therefore, the intake amount and the exhaust amount can be controlled simultaneously.

In addition, the adjustment of the degree of opening of the intake valve 20 and the adjustment of the degree of opening of the exhaust valve 30 are performed individually, but the sensed value SV1 of the same pressure sensor is fed back. Therefore, since the adjustment of the degree of opening of the intake valve 20 and the adjustment of the degree of opening of the exhaust valve 30 interact with each other (or compensate for each other), responsiveness increases.

In addition, the number of times that the intake valve 20 is controlled and the number of times that the exhaust valve 30 is controlled may be set to be the same or may be set at different ratios. The number of control operations may be tuned differently according to disturbances.

Figure 7:
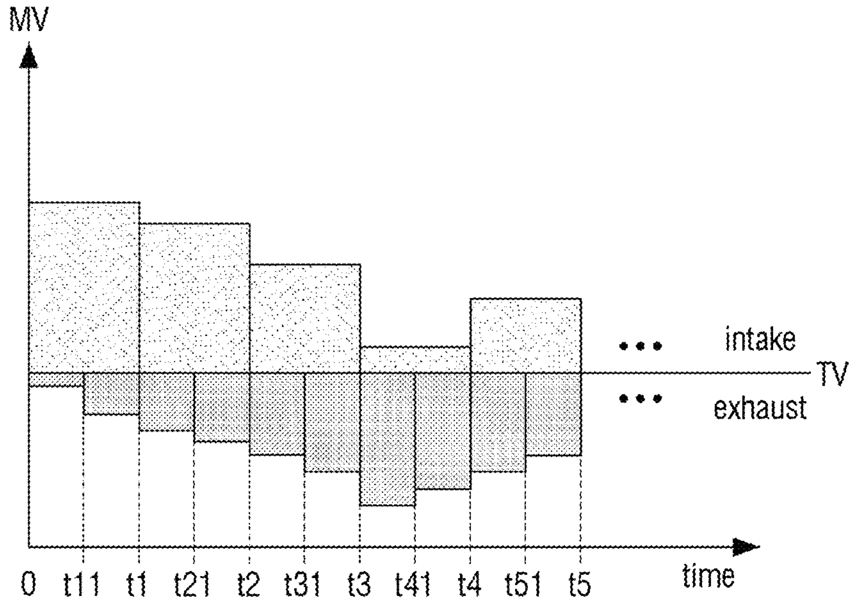
FIGS. 7 and 8 are diagrams for explaining the operation of the pressure control device according to the embodiments of the present disclosure.
Figure 8:
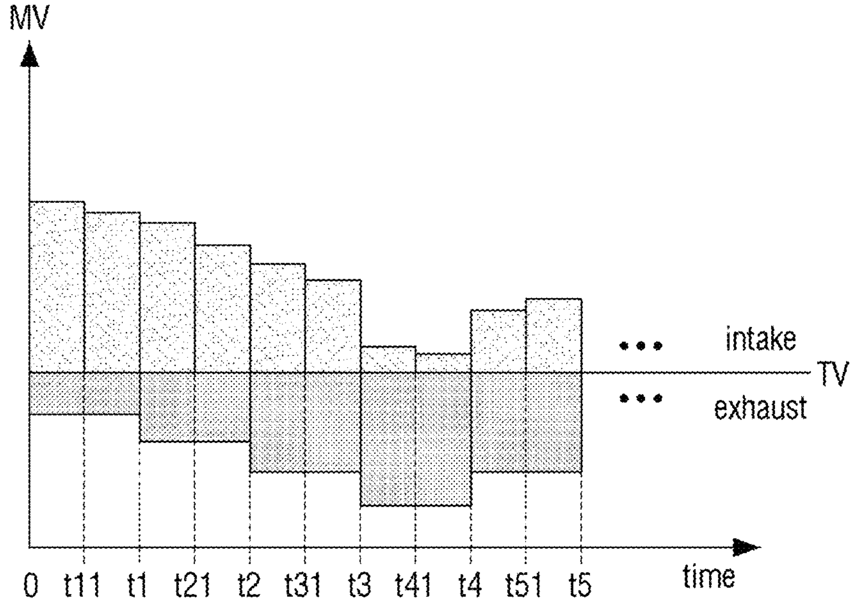

FIGS. 7 and 8 are diagrams for explaining the operation of the pressure control device 10 according to the embodiments of the present disclosure. For ease of description, differences from elements and features described with reference to FIGS. 1 through 6 will be mainly described below.

Referring to FIGS. 7 and 8, the x-axis represents time, and the y-axis represents manipulated variable MV. The manipulated variable above a center line indicates the degree of opening of the intake valve 20, and the manipulated variable below the center line indicates the degree of opening of the exhaust valve 30.

In FIG. 7, the number of times that the intake valve 20 is controlled is smaller than the number of times that the exhaust valve 30 is controlled. That is, while the intake valve control loop runs once, the exhaust valve control loop may run a plurality of times. In the drawing, while the intake valve control loop runs once, the exhaust valve control loop runs twice.

For example, the degree of opening of the intake valve 20 is adjusted once during the time from 0 to t1, and the degree of opening of the exhaust valve 30 is adjusted once during the time from 0 to t11 and once during the time from t11 to t1.

Likewise, the degree of opening of the intake valve 20 is adjusted once during the time from t1 to t2, and the degree of opening of the exhaust valve 30 is adjusted once during the time from t1 to t21 and once during the time from t21 to t2. The degree of opening of the intake valve 20 is adjusted once during the time from t2 to t3, and the degree of opening of the exhaust valve 30 is adjusted once during the time from t2 to t31 and once during the time from t31 to t3.

In FIG. 8, the number of times that the exhaust valve 30 is controlled is smaller than the number of times that the intake valve 20 is controlled. That is, while the exhaust valve control loop runs once, the intake valve control loop may run a plurality of times. In the drawing, while the exhaust valve control loop runs once, the intake valve control loop runs twice.

For example, the degree of opening of the exhaust valve 30 is adjusted once during the time from 0 to t1, and the degree of opening of the intake valve 20 is adjusted once during the time from 0 to t11 and once during the time from t11 to t1.

Likewise, the degree of opening of the exhaust valve 30 is adjusted once during the time from t1 to t2, and the degree of opening of the intake valve 20 is adjusted once during the time from t1 to t21 and once during the time from t21 to t2. The degree of opening of the exhaust valve 30 is adjusted once during the time from t2 to t3, and the degree of opening of the intake valve 20 is adjusted once during the time from t2 to t31 and once during the time from t31 to t3.

Unlike in the drawings, the exhaust valve control loop may run m times (where m is a natural number of 2 or greater) while the intake valve control loop runs n times (where n is a natural number of 2 or greater). For example, while the intake valve control loop runs two times, the exhaust valve control loop may run five times.

Figure 9:
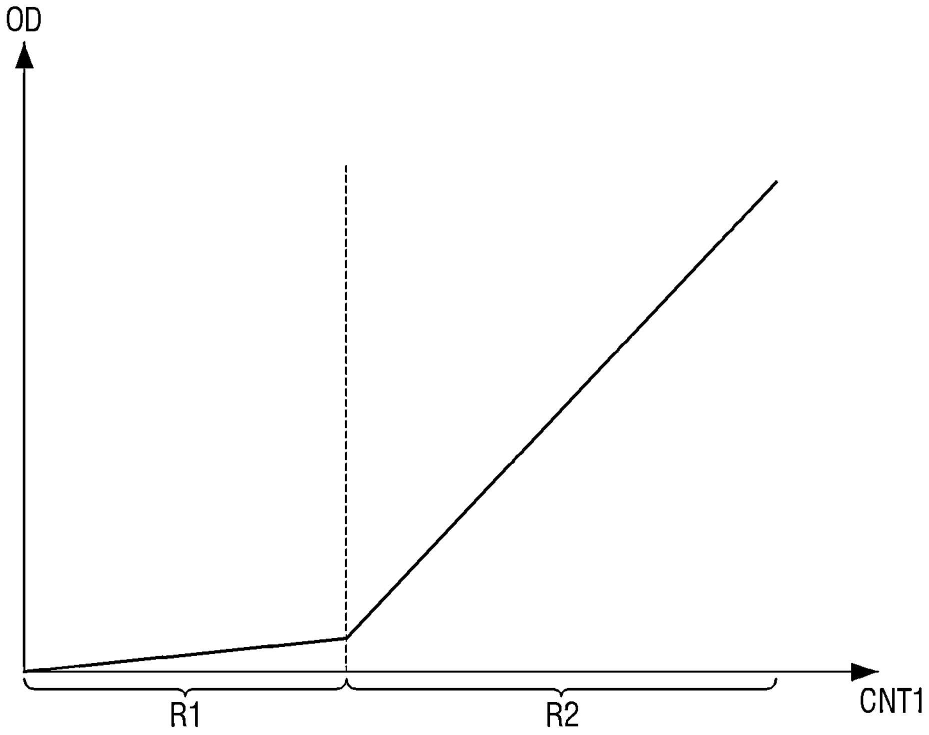
FIG. 9 is a diagram for explaining the intake valve or the exhaust valve of the pressure control device according to the embodiments of the present disclosure.

FIG. 9 is a diagram for explaining the intake valve 20 or the exhaust valve 30 of the pressure control device 10 according to the embodiments of the present disclosure. Although FIG. 9 mainly illustrates the relationship between the first control signal CNT1 and the degree of opening OD of the intake valve 20, the relationship between the second control signal CNT2 and the degree of opening OD of the exhaust valve 30 is also substantially the same as the illustrated relationship.

Referring to FIG. 9, the x-axis represents the first control signal CNT1, and the y-axis represents the degree of opening OD of a valve.

When an operating voltage at a low level is applied to the valve, the valve hardly opens. The range of this operating voltage is referred to as a non-operating range R1 of the valve.

When an operating voltage higher than a certain level is applied to the valve, the valve may open linearly according to the operating voltage. The range of this operating voltage is referred to as an operating range R2 of the valve. In the operating range R2, a change in the degree of opening of the valve according to a change in operating voltage is large. That is, the responsiveness of the valve to the change in operating voltage increases.

In some embodiments of the present disclosure, the controller 100 adjusts the degree of opening of the intake valve 20 within the operating range R2 of the intake valve 20. Likewise, the controller 100 adjusts the degree of opening of the exhaust valve 30 within the operating range R2 of the exhaust valve 30.

As illustrated in the drawing, even when an operating voltage at a lowest level in the operating range R2 is provided to the valve, the valve may slightly open. The degree of opening of the intake valve 20 and the degree of opening of the exhaust valve 30 are individually controlled at the same time. For example, the operating voltage at the lowest level may be applied to the exhaust valve 30, and thus the exhaust valve 30 may slightly open. In this case, the controller 100 adjusts the degree of opening of the intake valve 20 to compensate for the state of the exhaust valve 30. Since a compensation concept can be reflected in a control method in this way, the exhaust valve 30 and the intake valve 20 can be controlled in the highly responsive operating range R2.

Equipment using the pressure control device 10 described above will now be described with reference to FIGS. 10 through 12. Although a case where the pressure control device 10 is applied to inkjet equipment is described below as an example, the present disclosure is not limited to this case.

Figure 10:
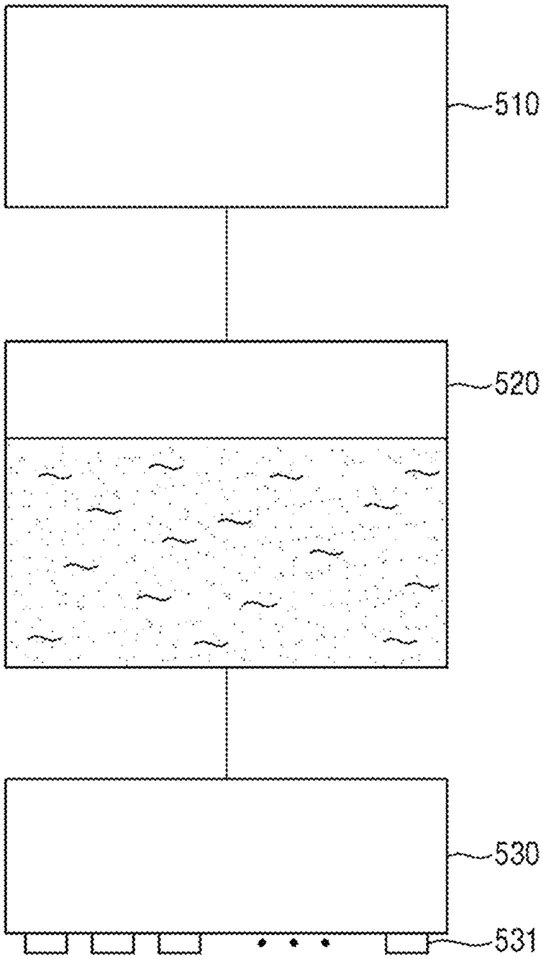
FIG. 10 illustrates a substrate treatment apparatus according to embodiments of the present disclosure.

FIG. 10 illustrates a substrate treatment apparatus according to embodiments of the present disclosure. FIG. 11 is a block diagram of a pressure control device 510 applied to the substrate treatment apparatus of FIG. 10. FIG. 12 is a block diagram of a specific implementation example of the pressure control device 510 of FIG. 11.

Referring to FIG. 10, the substrate treatment apparatus according to the embodiments of the present disclosure includes the pressure control device 510, a reservoir 520, an inkjet head 530, and inkjet nozzles 531.

Ink is accommodated in the reservoir 520, and the inkjet head 530 receives the ink from the reservoir 520. The inkjet nozzles 531 installed at an end of the inkjet head 530 eject the ink onto a substrate.

The pressure control device 510 selectively provides process negative pressure or process positive pressure to the reservoir 520. The process negative pressure is for controlling the meniscus of the inkjet head 530 (i.e., the inkjet nozzles 531), and the process positive pressure is for maintenance of the inkjet head 530.

Figure 11:
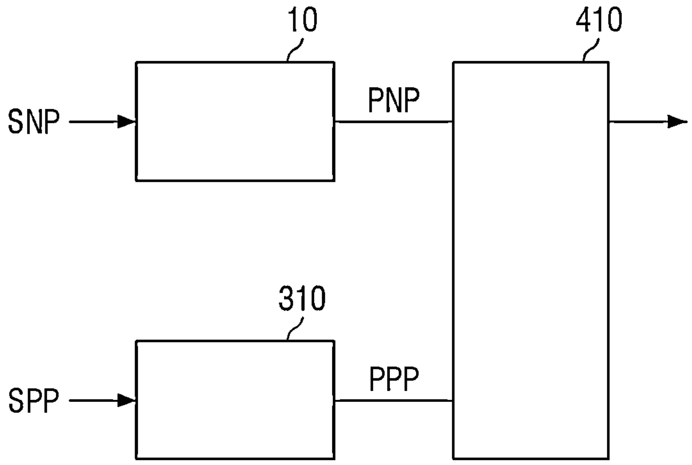
FIG. 11 is a block diagram of a pressure control device applied to the substrate treatment apparatus of FIG. 10.
Figure 12:
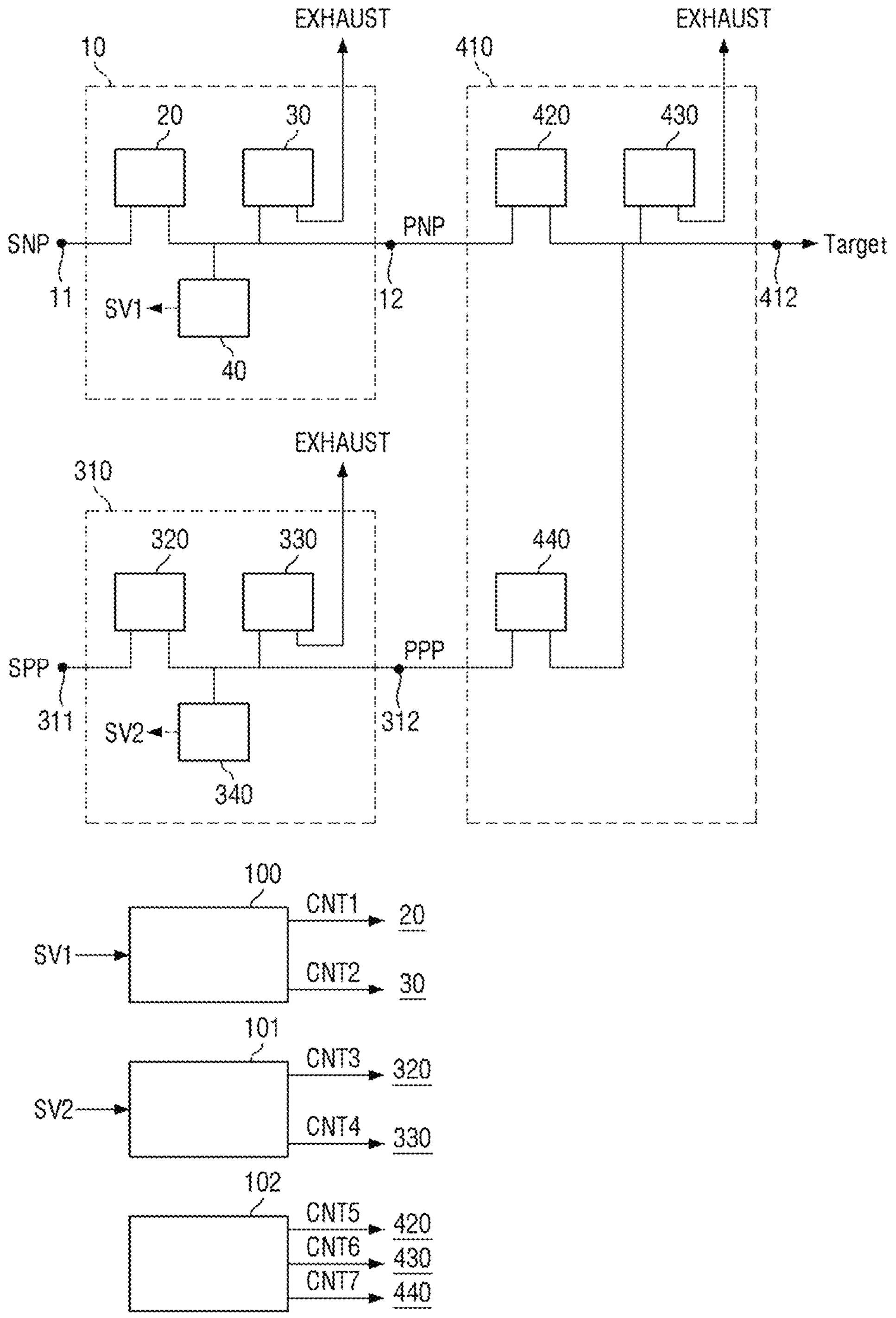
FIG. 12 is a block diagram of a specific implementation example of the pressure control device of FIG. 11.

Here, referring to FIGS. 11 and 12, the pressure control device 510 includes a negative pressure generating module 10, a positive pressure generating module 310, and a switching module 410. The pressure control device 10 described above with reference to FIGS. 1 through 9 may be applied to at least one of the negative pressure generating module 10 and the positive pressure generating module 310.

The negative pressure generating module 10 receives source negative pressure SNP and generates process negative pressure PNP for controlling the meniscus of the inkjet head 530 by operating a first intake valve 20 and a first exhaust valve 30.

The negative pressure generating module 10 includes a first input terminal 11, a first output terminal 12, the first intake valve 20, the first exhaust valve 30, a first pressure sensor 40, and a first controller 100.

The first input terminal 11 receives the source negative pressure SNP. The first intake valve 20 is connected between the first input terminal 11 and the first output terminal 12. The first exhaust valve 30 is connected between the first output terminal 12 and an external exhaust line. The first pressure sensor 40 is connected to the first output terminal 12 and generates a first sensed value SV1 by sensing the pressure at the first output terminal 12.

The first controller 100 simultaneously operates the first intake valve 20 and the first exhaust valve 30 by simultaneously operating a first control loop for adjusting the degree of opening of the first intake valve 20 by comparing the first sensed value SV1 with a first target value TV1 and a second control loop for adjusting the degree of opening of the first exhaust valve 30 by comparing the first sensed value SV1 with the first target value TV1. Control of the first intake valve 20 and control of the first exhaust valve 30 are individually performed. The first controller 100 may control the first intake valve 20 or the first exhaust valve 30 within an operating range of the first intake valve 20 or an operating range of the first exhaust valve 30. The first controller 100 generates a first control signal CNT1 for controlling the first intake valve 20 and a second control signal CNT2 for controlling the first exhaust valve 30.

The positive pressure generating module 310 receives source positive pressure SPP and generates process positive pressure PPP for maintenance of the inkjet head 530 by operating a second intake valve 320 and a second exhaust valve 330.

The positive pressure generating module 310 includes a second input terminal 311, a second output terminal 312, the second intake valve 320, the second exhaust valve 330, a second pressure sensor 340, and a second controller 101.

The second input terminal 311 receives the source positive pressure SPP. The second intake valve 320 is connected between the second input terminal 311 and the second output terminal 312. The second exhaust valve 330 is connected between the second output terminal 312 and an external exhaust line. The second pressure sensor 340 is connected to the second output terminal 312 and generates a second sensed value SV2 by sensing the pressure at the second output terminal 312.

The second controller 101 simultaneously operates the second intake valve 320 and the second exhaust valve 330 by simultaneously operating a third control loop for adjusting the degree of opening of the second intake valve 320 by comparing the second sensed value SV2 with a second target value TV2 and a fourth control loop for adjusting the degree of opening of the second exhaust valve 330 by comparing the second sensed value SV2 with the second target value TV2. Control of the second intake valve 320 and control of the second exhaust valve 330 are individually performed. The second controller 101 may control the second intake valve 320 or the second exhaust valve 330 within an operating range of the second intake valve 320 or an operating range of the second exhaust valve 330. The second controller 101 generates a third control signal CNT3 for controlling the second intake valve 320 and a fourth control signal CNT4 for controlling the second exhaust valve 330.

The switching module 410 selectively provides the process negative pressure PNP or the process positive pressure PPP to the reservoir 520.

The switching module 410 includes a third output terminal 412, a first switching valve 420, a second switching valve 440, and an air release valve 430.

The third output terminal 412 is connected to a target (e.g., the reservoir 520).

The first switching valve 420 is connected between the first output terminal 12 of the negative pressure generating module 10 and the third output terminal 412 to determine whether to transmit the process negative pressure PNP.

The second switching valve 440 is connected between the second output terminal 312 of the positive pressure generating module 310 and the third output terminal 412 to determine whether to transmit the positive process pressure PPP.

The air release valve 430 is connected to the third output terminal 412. The air release valve 430 operates between the opening of the first switching valve 420 and the opening of the second switching valve 440.

A third controller 102 does not control the first switching valve 420 and the second switching valve 440 to open simultaneously. For example, the third controller 102 opens the first switching valve 420 to provide the process negative pressure PNP to the reservoir 520 to adjust the meniscus of the inkjet head 530. Then, the third controller 102 opens the air release valve 430 to prevent pressure hunting. Next, the third controller 102 opens the second switching valve 440 to provide the process positive pressure PPP to the reservoir 520 to perform maintenance of the inkjet head 530.

The third controller 102 generates a fifth control signal CNT5 for controlling the first switching valve 420, a sixth control signal CNT6 for controlling the second switching valve 440, and a seventh control signal CNT7 for controlling the air release valve 430.

Although not separately illustrated, a pressure measuring device may be installed in the reservoir 520 (see FIG. 10) to measure the pressure (i.e., internal air pressure) of the reservoir 520. The controller 100 or 101 may generate a corrected sensed value by correcting the sensed value SV1 or SV2 of the pressure sensor 40 or 340 based on the pressure measured by the pressure measuring device. The controller 100 or 101 may use the corrected sensed value in at least one of the first through fourth control loops described above.

While the present disclosure has been particularly illustrated and described with reference to exemplary embodiments thereof, it will be understood by those of ordinary skill in the art that various changes in form and detail may be made therein without departing from the spirit and scope of the present disclosure as defined by the following claims. The exemplary embodiments should be considered in a descriptive sense only and not for purposes of limitation.

What is claimed is:

1. A pressure control device comprising:
an input terminal receiving source air pressure;
an intake valve connected between the input terminal and an output terminal;
an exhaust valve connected to the output terminal;
a pressure sensor connected to the output terminal and generating a sensed value by sensing pressure at the output terminal; and
a controller simultaneously operating the intake valve and the exhaust valve by simultaneously operating a first control loop for adjusting the degree of opening of the intake valve by comparing the sensed value with a first target value and a second control loop for adjusting the degree of opening of the exhaust valve by comparing the sensed value with a second target value.

2. The pressure control device of claim 1, wherein the first control loop increases the degree of opening of the intake valve when the sensed value is smaller than the first target value and reduces the degree of opening of the intake valve when the sensed value is greater than the first target value.

3. The pressure control device of claim 2, wherein the second control loop reduces the degree of opening of the exhaust valve when the sensed value is smaller than the second target value and increases the degree of opening of the exhaust valve when the sensed value is greater than the second target value.

4. The pressure control device of claim 3, wherein the first target value and the second target value are equal to each other.

5. The pressure control device of claim 1, wherein the number of first control operations of the first control loop and the number of second control operations of the second control loop are different from each other.

6. The pressure control device of claim 5, wherein while the first control loop runs once, the second control loop runs a plurality of times.

7. The pressure control device of claim 1, wherein the controller controls the degree of opening of the intake valve only within an operating range of the intake valve.

8. The pressure control device of claim 1, wherein the controller controls the degree of opening of the exhaust valve only within an operating range of the exhaust valve.

9. The pressure control device of claim 1, further comprising:
a reservoir connected to an inkjet head and receiving air pressure from the output terminal; and
a pressure measuring device installed in the reservoir to measure the pressure of the reservoir.

10. The pressure control device of claim 9, wherein the controller generates a corrected sensed value by correcting the sensed value received from the pressure sensor based on the pressure measured by the pressure measuring device.

11. A pressure control device comprising:
a negative pressure generating module receiving source negative pressure and generating process negative pressure through the operation of a first intake valve and a first exhaust valve;
a positive pressure generating module receiving source positive pressure and generating process positive pressure through the operation of a second intake valve and a second exhaust valve; and
a switching module selectively providing the process negative pressure or the process positive pressure to a target,
wherein the negative pressure generating module comprises:

a first input terminal receiving the source negative pressure;

the first intake valve connected between the first input terminal and a first output terminal;

the first exhaust valve connected to the first output terminal;

a first pressure sensor connected to the first output terminal and generating a first sensed value by sensing pressure at the first output terminal; and a controller simultaneously operating the first intake valve and the first exhaust valve by simultaneously operating a first control loop for adjusting the degree of opening of the first intake valve by comparing the first sensed value with a first target value and a second control loop for adjusting the degree of opening of the first exhaust valve by comparing the first sensed value with a second target value.

12. The pressure control device of claim 11, wherein the target is a reservoir connected to an inkjet head.

13. The pressure control device of claim 12, wherein the negative pressure generating module generates the process negative pressure to control the meniscus of the inkjet head, and the positive pressure generating module generates the process positive pressure for maintenance of the inkjet head.

14. The pressure control device of claim 11, wherein the switching module comprises:

a third output terminal connected to the target;

a first switching valve connected between the first output terminal of the negative pressure generating module and the third output terminal to determine whether to transmit the process negative pressure; and a second switching valve connected between the second output terminal of the positive pressure generating module and the third output terminal to determine whether to transmit the process positive pressure, wherein the first switching valve and the second switching valve do not open simultaneously.

15. The pressure control device of claim 14, wherein the switching modules further comprises an air release valve connected to the third output terminal and operating between the opening of the first switching valve and the opening of the second switching valve.

16. The pressure control device of claim 11, wherein the positive pressure generating module comprises:

a second input terminal receiving the source positive pressure;

the second intake valve connected between the second input terminal and a second output terminal;

the second exhaust valve connected to the second output terminal; and a second pressure sensor connected to the second output terminal and generating a second sensed value by sensing pressure at the second output terminal.

17. A substrate treatment apparatus comprising:

an inkjet head;

a reservoir storing ink, providing the ink to the inkjet head, and selectively receiving process negative pressure or process positive pressure; and a pressure control device selectively providing the process negative pressure or the process positive pressure to the reservoir, wherein the pressure control device comprises:

a negative pressure generating module receiving source negative pressure and generating the process negative pressure for controlling the meniscus of the inkjet head through the operation of a first intake valve and a first exhaust valve;

a positive pressure generating module receiving source positive pressure and generating the process positive pressure for maintenance of the inkjet head through the operation of a second intake valve and a second exhaust valve; and a switching module selectively providing the process negative pressure or the process positive pressure to a target, wherein the negative pressure generating module comprises a first input terminal receiving the source negative pressure, the first intake valve connected between the first input terminal and a first output terminal, the first exhaust valve connected to the first output terminal, a first pressure sensor connected to the first output terminal and generating a first sensed value by sensing pressure at the first output terminal, and a first controller simultaneously operating the first intake valve and the first exhaust valve by simultaneously operating a first control loop for adjusting the degree of opening of the first intake valve by comparing the first sensed value with a first target value and a second control loop for adjusting the degree of opening of the first exhaust valve by comparing the first sensed value with the first target value, and the positive pressure generating module comprises a second input terminal receiving the source positive pressure, the second intake valve connected between the second input terminal and a second output terminal, the second exhaust valve connected to the second output terminal, a second pressure sensor connected to the second output terminal and generating a second sensed value by sensing pressure at the second output terminal, and a second controller simultaneously operating the second intake valve and the second exhaust valve by simultaneously operating a third control loop for adjusting the degree of opening of the second intake valve by comparing the second sensed value with a second target value and a fourth control loop for adjusting the degree of opening of the second exhaust valve by comparing the second sensed value with the second target value.

18. The substrate treatment apparatus of claim 17, wherein the switching module comprises:

a third output terminal connected to the reservoir;

a first switching valve connected between the first output terminal of the negative pressure generating module and the third output terminal to determine whether to transmit the process negative pressure; and a second switching valve connected between the second output terminal of the positive pressure generating module and the third output terminal to determine whether to transmit the process positive pressure, wherein the first switching valve and the second switching valve do not open simultaneously.

19. The substrate treatment apparatus of claim 18, wherein the switching modules further comprises an air release valve connected to the third output terminal and operating between the opening of the first switching valve and the opening of the second switching valve.

20. The substrate treatment apparatus of claim 17, wherein the first controller controls the first intake valve or the first exhaust valve only within an operating range of the first intake valve or an operating range of the first exhaust valve.

* * * * *